United States Patent
Ueda

[11] Patent Number: 5,423,077
[45] Date of Patent: Jun. 6, 1995

[54] RADIO TELEPHONE SUITABLE FOR PORTABLE AND VEHICLE-MOUNTED USE

[75] Inventor: Hideki Ueda, Tokyo, Japan

[73] Assignee: NEC Corporation, Japan

[21] Appl. No.: 510,625

[22] Filed: Apr. 18, 1990

[30] Foreign Application Priority Data

Apr. 20, 1989 [JP] Japan ................... 1-100613

[51] Int. Cl.[6] .............................................. H04B 1/16
[52] U.S. Cl. ........................................ 455/89; 455/127; 455/343; 455/345
[58] Field of Search ................ 455/89, 127, 343, 315, 455/345, 346, 351; 330/127; 379/58, 61

[56] References Cited

U.S. PATENT DOCUMENTS

| | | | |
|---|---|---|---|
| 4,636,741 | 1/1987 | Mitzlaff | 455/89 |
| 4,858,006 | 8/1989 | Sozuki et al. | 455/343 |
| 4,939,770 | 7/1990 | Makino | 455/127 |
| 4,962,523 | 10/1990 | Tanaka | 455/89 |
| 5,027,428 | 6/1991 | Ishigoro et al. | 455/343 |

FOREIGN PATENT DOCUMENTS

| | | | |
|---|---|---|---|
| 0112048 | 8/1980 | Japan | 455/343 |
| 0103239 | 6/1983 | Japan | 455/343 |
| 0026028 | 2/1991 | Japan | 455/343 |

*Primary Examiner*—Edward F. Urban
*Assistant Examiner*—Chi Pham
*Attorney, Agent, or Firm*—Ostrolenk, Faber, Gerb & Soffen

[57] ABSTRACT

A portable radio telephone comprises a receiver section including at least an RF amplifier and a first frequency mixer. The telephone also comprises a battery which supplies a first voltage to the receiver section when the telephone is in portable use. When the telephone is mounted on a vehicle, a vehicle battery applies a second voltage which is higher than the first voltage, to the RF amplifier and to the frequency mixer. By this higher voltage supply, the intermodulation characteristic and reception sensitivity of the receiver section can be improved in the vehicle-mounted use. On the other hand, battery saving can be achieved by the lower voltage supply in the portable use.

36 Claims, 3 Drawing Sheets

RADIO TELEPHONE SUITABLE FOR PORTABLE AND VEHICLE-MOUNTED USE

BACKGROUND OF THE INVENTION

The present invention relates to a radio apparatus and, more particularly, to a radio telephone to be used as a portable or a vehicle-mounted telephone.

A conventional radio telephone is energized by a battery in portable use and by a vehicle battery in vehicle-mounted use. In both cases, a DC voltage is applied to a receiver section through a voltage stabilizer. The voltage to be applied to the receiver section is minimized to save the battery power in the portable use. As a result, in the vehicle-mounted use, receiver performance such as an intermodulation (IM) characteristic and reception sensitivity is sacrificed for the power saving. On the contrary, if the voltage is increased to improve the receiver performance, the life of the battery for portable use will be shortened.

SUMMARY OF THE INVENTION

An object of the present invention is, therefore, to provide a radio telephone suitable for both portable and vehicle-mounted use.

Another object of the present invention is to provide a radio telephone capable of saving power in portable use while improving the receiver performance in vehicle-mounted use.

Yet another object of the present invention is to provide a radio telephone having an improved IM characteristic and reception sensitivity in its vehicle-mounted use.

A further object of the present invention is to provide a radio telephone consuming less power in its portable use.

According to the present invention, there is provided a portable radio telephone comprising, a receiver section which includes at least an RF amplifier and a first frequency mixer. The telephone also comprises a battery which supplies a first voltage to the receiver section when the telephone is in portable use. When the telephone is mounted on a vehicle, a vehicle battery applies a second voltage which is higher than the first voltage, to the RF amplifier and to the frequency mixer. By this higher voltage supply, the intermodulation characteristic and reception sensitivity of the receiver section can be improved in the vehicle-mounted use. On the other hand, battery saving can be achieved by the lower voltage supply in the portable use.

BRIEF DESCRIPTION OF THE DRAWINGS

The above and other object, features and advantages of the present invention will become more apparent from the following description referring to the accompanying drawings, in which.

DETAILED DESCRIPTION OF THE PREFERRED EMBODIMENTS

Figure 1:
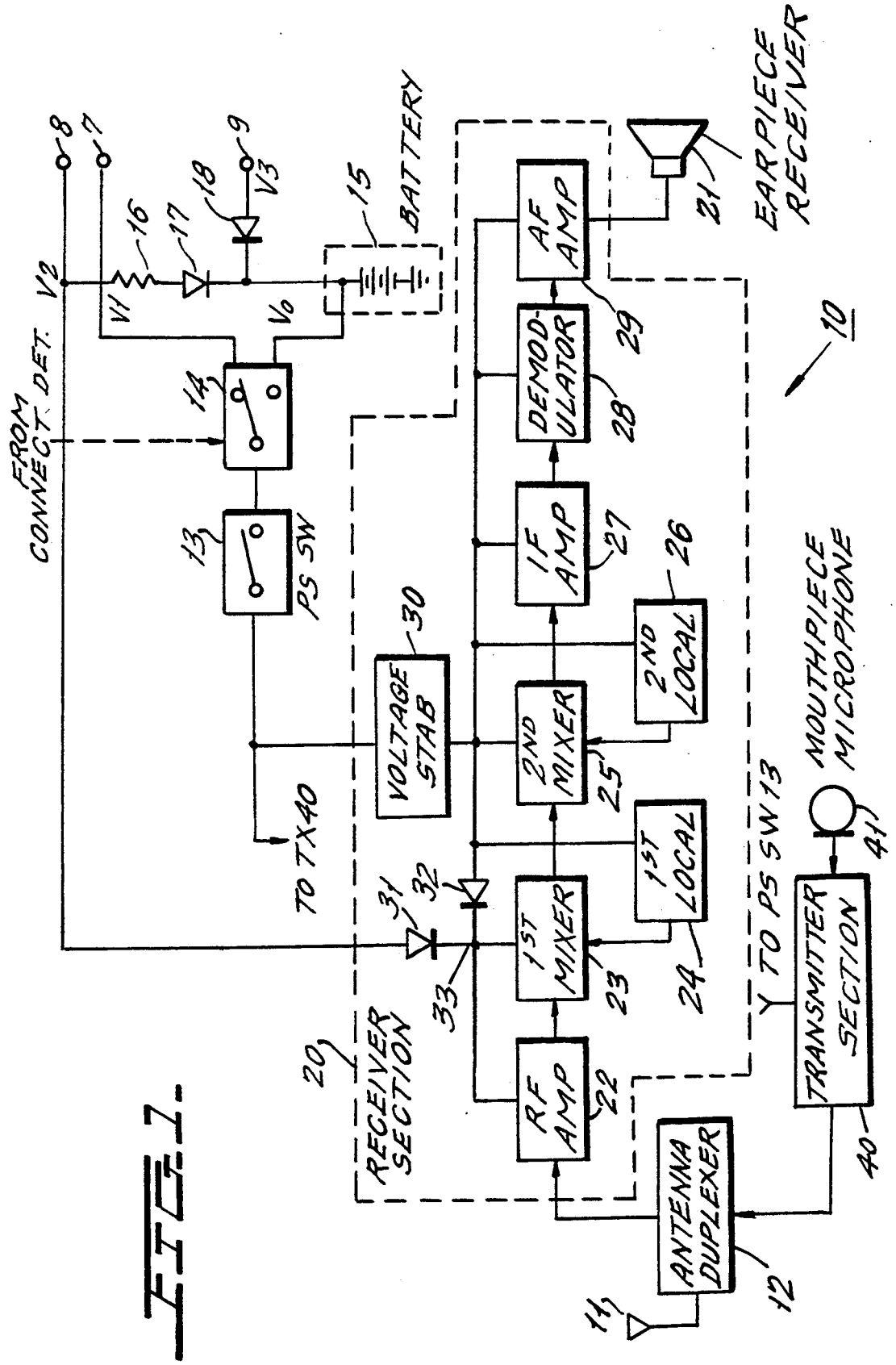
FIG. 1 is a block diagram showing a radio telephone embodying the present invention.

In FIG. 1, a radio telephone 10 includes an antenna 11 picking up a radio frequency (RF) signal and radiating an RF signal. The picked-up RF signal is supplied to a receiver section 20 through an antenna duplexer 12. The receiver section 20, which will be described in detail later, demodulates the supplied RF signal to provide an audio frequency (AF) signal to an earpiece receiver or speaker 21. In response to the AF signal, the speaker 21 produces an audible signal.

An audible signal which is picked up by a mouthpiece microphone 41 is supplied to a transmitter section 40 at which the audible signal is subject to modulation and frequency conversion to become an RF signal. The RF signal from the transmitter section 40 is transmitted through the antenna duplexer 12 and antenna 11 to a mobile base station (not shown), for example. The earpiece receiver 21 and the microphone 41 may be accommodated in the earpiece and mouthpiece portions of a handset (not shown) of the telephone 10.

Figure 2:
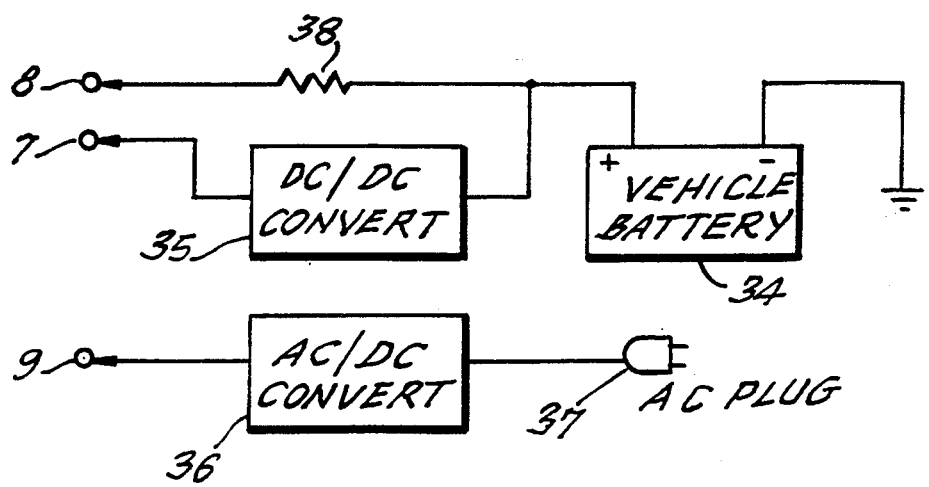
FIG. 2 is a block diagram illustrating a power supply source to be connected to the FIG. 1 telephone.

The radio telephone 10 further includes a rechargeable battery 15 from which a direct current (DC) voltage $V_0$ is to be supplied through a power supply switch 13 and a power source switch 14 to both the receiver section 20 and the transmitter section 40. The battery 15 may be attached to or built in the radio telephone 10. The power source switch 14 is also connected to a terminal 7 to which a DC voltage $V_1$ is to be applied from a DC/DC converter 35 connected to a vehicle battery 34 (see FIG. 2). The switch 14 connects the terminal 7 to the power supply switch 13 when the radio telephone 10 is mounted on a vehicle for vehicle-mounted use. On the other hand, the switch 14 connects the battery 15 to the power supply switch 13 when the telephone 10 is removed from the vehicle for portable use. The switch 14 may manually or automatically be controlled. To achieve the automatic control, a connection detector may be provided which detects an electrical coupling between the radio telephone 10 and a vehicle battery. Such a connection detector is disclosed in U.S. Pat. No. 4,654,882 which is assigned to the same assignee as the present application and incorporated herein.

When the radio telephone 10 is mounted on a vehicle, a voltage $V_2$ is applied from the vehicle battery 34 (FIG. 2) to the receiver section 20 though a resistor 38. The voltage $V_2$ is also applied to the rechargeable battery 15 through a resistor 16 and a diode 17 in order to charge the battery 15. The battery 15 is also charged by a DC voltage $V_3$ which is applied through a terminal 9 and a diode 18. The voltage $V_3$ may be obtained from a commercial alternating current (AC) voltage using an AC/DC converter 36 to which an AC plug 37 is connected (see FIG. 2). The voltage $V_2$ is higher than the voltage $V_0$, $V_1$ and $V_3$ and may be 13.8 volts, for example. The voltages $V_0$, $V_1$ and $V_3$ may be substantially equal to each other and $V_0$ and $V_1$ may be 7 volts and $V_3$, 7.7 volts.

The receiver section 20 is a double superheterodyne type receiver, which is well known in the art and thus will be briefly described below. The receiver section 20 comprises an RF amplifier 22 for amplifying an RF signal which is supplied from the antenna 11 through the antenna duplexer 12. The RF amplifier 22 supplies the amplified RF signal to a first frequency mixer or converter 23 to which a first local oscillation signal is also supplied from a first local oscillator 24. The first mixer 23 frequency mixes the RF signal and the first local oscillation signal to produce a first intermediate frequency (IF) signal.

The first mixer 23 supplies the first IF signal to a second frequency mixer or converter 25 to which a second local oscillation signal is also supplied from a second oscillator 26. The second mixer 25 frequency mixes the first IF signal and the second local oscillation signal to produce a second IF signal. The second mixer 25 supplies the second IF signal to an IF amplifier 29 which amplifies the second IF signal and supplies the amplified signal to a demodulator 28. The demodulator 28 demodulates the second IF signal to produce an audio frequency (AF) signal and supplies the AF signal to an AF amplifier 29. The amplifier 29 amplifies the AF signal and supplies the amplified AF signal to the earpiece receiver 21 from which the AF signal is outputted as an audible signal.

The receiver section 20 further includes a voltage stabilizer 30 to which one of the voltages $V_0$ and $V_1$ is applied through the switches 13 and 14. The stabilizer 30 supplies a stabilized voltage of 5 volts, for example, to the RF amplifier 22 and the first mixer through a diode 32 and to the other elements 24 to 29 directly. To the RF amplifier 22 and the first mixer 21, the vehicle battery voltage $V_2$ is to be applied through a diode 31. Thus, when the radio telephone 10 is mounted on a vehicle, the higher voltage $V_2$ is applied to the RF amplifier 22 and the first mixer 23. In this case, the lower voltage $V_1$ is applied to the other elements 24 to 29. When the radio telephone 10 is demounted from the vehicle for portable use, the lower battery voltage $V_0$ is applied to all the receiver section elements 22 to 29.

Figure 3:
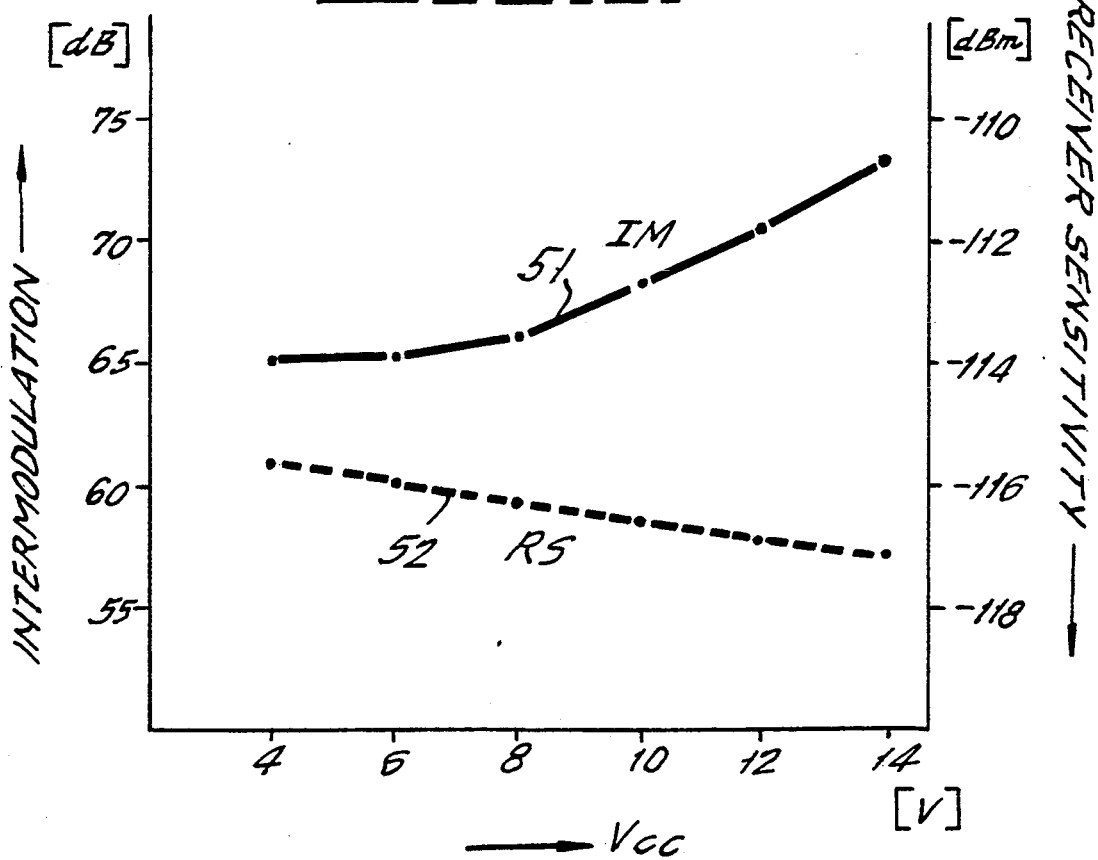
FIG. 3 shows a graph demonstrating a IM characteristic and reception sensitivity with respect to a supply voltage which were obtained from the telephone shown in FIG. 1.

FIG. 3 shows an IM characteristic with respect to a voltage Vcc applied to the RF amplifier 22 and the first mixer 23. FIG. 3 also shows a reception sensitivity (RS) vs. voltage Vcc characteristic. These characteristics have been measured using a mock-up set. It can be seen from the IM vs. voltage Vcc characteristic 51 that as the voltage Vcc increases, the IM characteristic is improved. Similarly, it can be seen from the RS vs. voltage Vcc characteristic 52 that as the voltage Vcc increases, the reception sensitivity also increases. Thus, when the higher voltage is applied to the RF amplifier 22 and the first mixer 23, both the IM and RS characteristics can be improved.

It should be noted that to improve the IM and RS characteristics the higher voltage may be applied to only one of RF amplifier 22 and first mixer 23. In this case, applying the higher voltage to the first mixer 23 gives a better result than to the RF amplifier 22.

Figure 4:
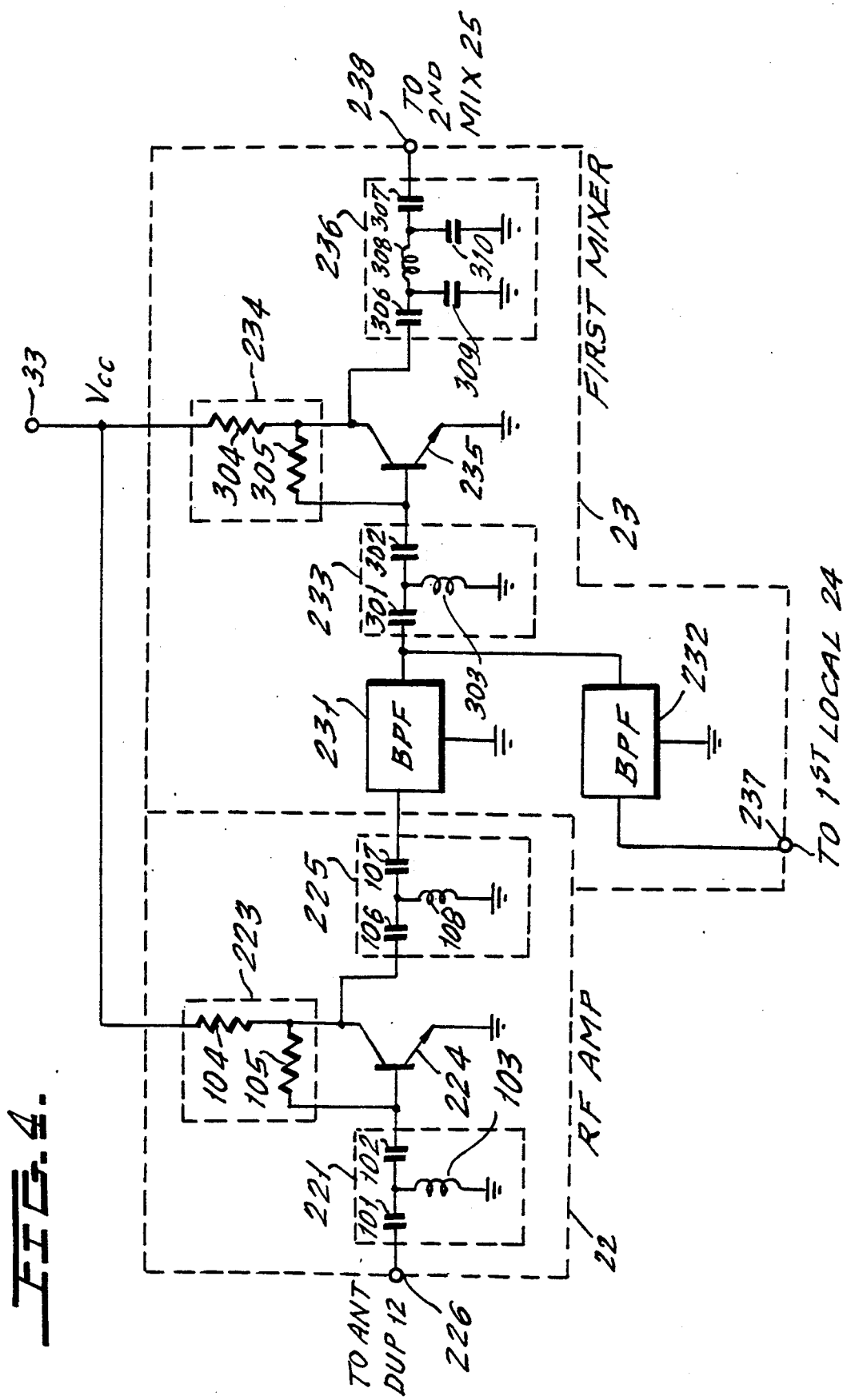
FIG. 4 is a schematic circuit diagram showing an RF amplifier and a first frequency mixer in the FIG. 1 telephone.

In FIG. 4, the RF amplifier is composed of impedance matching circuits 221 and 225, a bias circuit 223 and an NPN transistor 224. The matching circuit 221 includes a capacitor 101 one of whose ends is connected to a terminal 226 to which the antenna duplexer 12 is connected. The other end of capacitor 101 is grounded through an inductor 103. The junction of the capacitor 101 and the inductor 103 is connected to one end of capacitor 102 whose other end is connected to the base of transistor 224. The collector of transistor 224 is connected to the terminal 33 through a resistor 104 of bias circuit 223. A resistor 105 of bias circuit 223 is connected between the collector and base of transistor 224. The emitter of transistor 224 is grounded.

The matching circuit 225 includes a capacitor 106 one of whose ends is connected to the collector of transistor 224. The other end of capacitor 106 is connected to ground through an inductor 108. The junction of the capacitor 106 and the inductor 108 is connected to one end of capacitor 107 whose other end is connected to the output of RF amplifier 22.

The first mixer 23 is composed of two band-pass filters (BPFs) 231 and 232, impedance matching circuits 233 and 236, a bias circuit 234 and an NPN transistor 235. The input of BPF 231 is connected to the output of RF amplifier 22. The input of BPF 232 is connected to the output of first local oscillator 24. The outputs of BPFs 231 and 232 are connected to the matching circuit 233. The matching circuit 233 includes a capacitor 301 one of whose ends is connected to the outputs of BPFs 231 and 232. The other end of capacitor 301 is connected to ground through an inductor 303. The junction of the capacitor 301 and the inductor 303 is connected to one end of capacitor 302 whose other end is connected to the base of transistor 235. The collector of transistor 235 is connected to the terminal 33 through a resistor 304 of bias circuit 234. A resistor 305 of bias circuit 234 is connected between the collector and base of transistor 235.

The matching circuit 236 includes a capacitor 306 one of whose ends is connected to the collector of transistor 235. The other end of capacitor 306 is connected to ground through a capacitor 309. The junction of the capacitors 306 and 309 is connected to one end of inductor 308 whose other end is grounded through a capacitor 310. The other end of inductor 308 is also connected through a capacitor 307 to a terminal 238 which in turn is connected to the input of second mixer 25.

In operation, an RF signal is applied from the antenna duplexer 12 to the base of transistor 224 through the terminal 226 and the matching circuit 221. The transistor 224 amplifies the RF signal and outputs the amplified RF signal at its collector. The amplified RF signal is then supplied to BPF 231 through the matching circuit 225. Operating and bias voltages are applied to the collector and base of transistor 224 through the terminal 33 and the bias circuit 223. As the applied voltages increase, the IM and RS characteristics are improved, as shown in FIG. 3.

BPF 231 filters the amplified RF signal to pass and supply a desired RF signal to the base of transistor 235 through the matching circuit 233. BPF 232 filters the first local oscillation signal to pass and supply a desired local oscillation signal to the base of transistor 235 through the matching circuit 233. The transistor 235 frequency mixes the supplied RF and local oscillation signals with its nonlinear characteristic to provide a first IF signal at its collector. The first IF signal is supplied to the second frequency mixer 25 through the matching circuit 236 and the terminal 238. Operating and bias voltages are applied to the collector and base of transistor 235 through the terminal 33 and the bias circuit 234. As the applied voltages increase, the IM and RS characteristics are improved, as shown in FIG. 3.

What is claimed is:
1. A radio telephone comprising:
  means for receiving a radio frequency (RF) signal to produce a received signal;
  receiver means including:
  (a) RF amplifier means for amplifying said received signal to produce an amplified signal;
  (b) mixer means for mixing the frequency of said amplified signal and a local oscillation frequency to produce an intermediate frequency (IF) signal; and

(c) demodulator means for demodulating said IF signal to produce a demodulated signal;

first and second power source means for respectively providing first and second voltages, said first voltage being lower than said second voltage; and supply means for selectively supplying one of said first and second voltages to at least one of said RF amplifier means and said mixer means; and wherein said first voltage is supplied to said receiver means, when said radio telephone is in portable use; and wherein said second voltage is supplied to said at least one of said RF amplifier means and said mixer means, when said radio telephone is in vehicle-mounted use.

2. A radio telephone as claimed in claim 1, wherein said first power source means comprises a rechargeable battery built in said telephone.

3. A radio telephone as claimed in claim 2, wherein said second power source means comprises charge means connected to a vehicle battery for charging said rechargeable battery.

4. A radio telephone as claimed in claim 3, wherein said charge means comprises a resistor and a diode which are serially connected between said vehicle battery and said rechargeable battery.

5. A radio telephone as claimed in claim 2, further comprising a terminal to be connected to an AC/DC converter which converts an alternating current (AC) voltage into a direct current (DC) voltage, said terminal being connected to said rechargeable battery.

6. A radio telephone as claimed in claim 1, wherein said first power source means comprises:

a battery for producing said first voltage;

a terminal to be connected to a DC/DC converter which converts a vehicle battery voltage into said first voltage; and means connected to said battery and to said terminal for selecting one of said battery and said terminal for supplying said first voltage.

7. A radio telephone as claimed in claim 6, wherein said first power source means further comprises stabilizer means for voltage stabilizing the selected voltage to produce a stabilized voltage as the output of said first power source means.

8. A radio telephone as claimed in claim 6, wherein said selecting means comprises means for manually switching between said battery and said terminal.

9. A radio telephone as claimed in claim 6, wherein said selecting means comprises connection detector means for producing a first detection signal in response to the connection of said telephone to a vehicle battery and a second detection signal in response to the disconnection of said telephone from said vehicle battery; and switch means for selecting the voltage from said battery in response to said second detection signal and the voltage from said terminal in response to said first detection signal.

10. A radio telephone as claimed in claim 1, wherein said supply means comprises first and second diodes connected respectively between said first power source means and said RF amplifier means and said mixer means and between said second power source means and said RF amplifier means and said mixer means.

11. A portable telephone having antenna means for receiving a radio frequency (RF) signal to produce a received RF signal and a receiver section which includes at least radio frequency (RF) amplifier means for amplifying said received RF signal and first frequency mixer means for frequency mixing the amplified RF signal and a first local oscillation signal to produce an intermediate frequency (IF) signal, said telephone comprising:

battery means for supplying a battery voltage to said receiver section;

power source switch means for selectively supplying as a first voltage either said battery voltage or another voltage which is applied from outside of said telephone, said other voltage being substantially equal to said battery voltage; and supply means for selectively supplying to said receiver section either the output of said power source switch means or a second voltage which is applied from outside of said telephone, said second voltage being higher than said first voltage; and wherein said first voltage is supplied to said receiver section, when said second voltage is not applied from outside of said telephone; and wherein said second voltage is supplied to said at least one of said RF amplifier means and said first frequency mixer means, when said second voltage is applied from outside of said telephone.

12. A telephone as claimed in claim 11, further comprising charge means responsive to said second voltage for charging said battery means.

13. A telephone as claimed in claim 11, wherein said receiver section further comprises:

second frequency mixer means for frequency mixing the output of said first frequency mixer and a second local oscillation signal;

demodulator means for demodulating the output of said second frequency mixer means to produce an audio frequency (AF) signal; and speaker means for outputting said AF signal as an audible signal.

14. A telephone as claimed in claim 13, further comprising:

microphone means for picking up an AF signal to produce a microphone output; and transmitter means for utilizing said microphone output to modulate an RF signal.

15. An apparatus comprising:

means for receiving a radio frequency (RF) signal to produce a received (RF) signal; and a receiver section including:

(a) amplifier means for amplifying said received signal to produce an amplified RF signal;

(b) frequency converter means for frequency converting said amplified RF signal into an intermediate frequency (IF) signal; and power supply means for supplying a first voltage;

terminal means for receiving a second voltage from outside of the apparatus, said second voltage being higher than said first voltage; and switch means for supplying one of said first and second voltages to at least one of said amplifier means and said frequency converter means;

wherein said switch means supplies said first voltage to all of said receiver section, when said second voltage is not supplied from said terminal means; and wherein said switch means supplies said second voltage to said at least one of said RF amplifier means and said mixer means, and said first voltage is supplied to the rest of said receiver section, when said second voltage is supplied from said terminal means.

16. An apparatus as claimed in claim 15, wherein said power supply means comprises a rechargeable battery, and wherein said apparatus further comprises charge means for charging said rechargeable battery.

17. An apparatus as claimed in claim 16, further comprising vehicle battery means for supplying said second voltage from a vehicle battery; and AC/DC converter means for converting an AC voltage into a DC voltage, wherein said charge means comprises means for charging said rechargeable battery by a voltage from one of said vehicle battery means and said AC/DC converter means.

18. A radio telephone comprising:
antenna means for picking up an RF signal;
a receiver section including:
(a) RF amplifier means for amplifying the pickedup RF signal to produce an amplified RF signal;
(b) first local oscillator means for generating a first local oscillation signal;
(c) first frequency mixer means for frequency mixing said amplified RF signal and said first local oscillation signal to produce a first IF signal;
(d) second local oscillator means for generating a second local oscillation signal;
(e) second frequency mixer means for frequency mixing said first IF signal and said second local oscillation signal to produce a second IF signal;
(f) IF amplifier means for amplifying said second IF signal to produce an amplified IF signal; and
(g) demodulator means for demodulating said amplified IF signal to produce an audio signal;
speaker means for outputting said audio signal as an audible signal;
first power supply means for supplying a first voltage to all of said elements (a)-(g) in said receiver section when said telephone is in portable use; and
second power supply means for supplying a second voltage to said IF amplifier means (a) and said first frequency mixer means (c) and supplying said first voltage to the rest of said elements (b) and (d)-(g) in said receiver section when said telephone is mounted on a vehicle, said second voltage being higher than said first voltage.

19. A telephone as claimed in claim 18, wherein said first power supply means comprises means for deriving said first voltage from a battery attached to said telephone, and wherein said second power supply means comprises means for deriving said second voltage from a vehicle battery of said vehicle.

20. A method of supplying power to a portable radio telephone including antenna means for receiving a radio frequency (RF) signal to produce a received RF signal, at least an RF amplifier for amplifying said received RF signal and a frequency mixer for converting the output frequency of said RF amplifier into an intermediate frequency (IF), said method comprising the steps of:
applying a first power supply voltage to said RF amplifier and to said frequency mixer when said portable radio telephone is in portable use; and
applying a second power supply voltage to either said RF amplifier or said frequency mixer when said portable radio telephone is mounted on a vehicle and electrically connected to a power supply on said Vehicle, said second voltage being higher than said first voltage and having a magnitude at least twice as large as said first voltage to improve receiver performance.

21. A method as claimed in claim 20, wherein said step of applying said first voltage comprises the step of feeding said first voltage from a rechargeable battery built in said portable radio telephone to said RF amplifier and said frequency mixer, and wherein said step of applying said second voltage comprises the step of feeding said second voltage from a vehicle battery of said vehicle to either said RF amplifier or said frequency mixer.

22. A method as claimed in claim 21, further comprising the step of charging said rechargeable battery with either said second voltage from said vehicle battery or a voltage from an AC/DC converter which converts an AC voltage into a DC voltage.

23. A method as claimed in claim 21, further comprising the step of applying said first voltage from said vehicle battery to said portable radio telephone except for said RF amplifier and frequency mixer.

24. A method of controlling power supply to a radio telephone, comprising the steps of:
amplifying a received RF signal produced by antenna means with an RF amplifier to produce an amplified signal;
frequency converting said amplified signal with a frequency converter to produce an IF signal;
demodulating said IF signal to produce a demodulated signal;
producing first and second power supply voltages, said second voltage being higher than said first voltage;
supplying said first voltage to said RF amplifier and said frequency converter, when said radio telephone is in portable use; and
supplying said second voltage to at least one of said RF amplifier and said frequency converter to improve receiver performance, when said radio telephone is in vehicle-mounted use and electrically connected to a power supply on said vehicle.

25. A method as claimed in claim 24, further comprising the steps of:
supplying said first voltage from a rechargeable battery built in said telephone; and
charging said rechargeable battery with a voltage from a vehicle battery.

26. A method as claimed in claim 24, further comprising the steps of:
supplying said first voltage from a rechargeable battery built in said telephone;
converting an AC voltage into a DC voltage; and
charging said rechargeable battery with said DC voltage.

27. A method of controlling power supply to a receiver section of an apparatus, said receiver section including at least a radio frequency (RF) amplifier for amplifying a received RF signal produced by antenna means and a frequency mixer for converting the output frequency of said RF amplifier into an intermediate frequency (IF), comprising the steps of:
selecting either one power supply voltage or another power supply voltage to produce a first voltage, said another voltage being substantially equal to said one voltage and being supplied from outside of said apparatus;
applying said first voltage to said receiver section including said RF amplifier and said frequency mixer; and applying to at least one of said RF amplifier and said frequency mixer a second voltage which is supplied from outside of said apparatus, when said another voltage and said second voltage are supplied from outside of said apparatus, said second voltage being higher than said first voltage.

28. A method as claimed in claim 27, further comprising the step of stabilizing said first voltage.

29. A method as claimed in claim 27, wherein said step of applying said first voltage comprises the step of applying said first voltage from a battery attached to said apparatus including said receiver section, and wherein said method further comprises the step of supplying said another and second voltages from a vehicle battery.

30. A method as claimed in claim 29, further comprising the step of charging said battery with a voltage from said vehicle battery.

31. A radio telephone comprising:

antenna means for receiving a radio frequency (RF) signal to produce a received RF signal;

RF amplifier means for amplifying the received RF signal to product an amplified RF signal;

mixer means for mixing the frequency of said amplified RF signal and a local oscillation frequency to produce an intermediate frequency (IF) signal;

demodulator means for demodulating said IF signal to produce a demodulated signal;

first battery means for providing a battery voltage;

first and second input terminals;

additional battery means, which can be connected to said first and second input terminals, for supplying a first outside voltage to said first input terminal and for supplying a second outside voltage to said second input terminal, said first outside voltage being lower than said second outside voltage;

generating means for generating a first voltage from said battery voltage or said first outside voltage, said first voltage being lower than said second outside voltage; and first supply means for supplying said first voltage to said RF amplifier means and said mixer means, when said additional battery means is not connected to said first and second input terminals; and second supply means for supplying said second outside voltage to at least one of said RF amplifier means and said mixer means, when said additional battery means is connected to said first and second input terminals, to improve receiving performance.

32. A radio telephone as claimed in claim 31, wherein said additional battery means comprises:

a vehicle battery for producing said second outside voltage; and a DC/DC converter for converting a vehicle battery voltage into said first outside voltage.

33. A radio telephone as claimed in claim 31, wherein said first battery means comprises a rechargeable battery built in said radio telephone.

34. A radio telephone as claimed in claim 33, further comprising charge means connected to said second input terminal for charging said rechargeable battery.

35. A radio telephone as claimed in claim 34, wherein said charge means comprises a resistor and a diode which are serially connected between said second input terminal and said rechargeable battery.

36. A radio telephone as claimed in claim 33, further comprising a third input terminal connectable to a AC/DC converter which converts an alternating current (AC) voltage into a direct current (DC) voltage, said third input terminal being connected to said rechargeable battery.

* * * * *